(12) United States Patent
Watanabe (10) Patent No.: US 8,784,724 B2
(45) Date of Patent: Jul. 22, 2014

(54) SEAL COMPONENT MANUFACTURING METHOD AND MOLD

(75) Inventor: Shigeru Watanabe, Fujisawa (JP)

(73) Assignee: NOK Corporation (JP)

( * ) Notice: Subject to any disclaimer, the term of this patent is extended or adjusted under 35 U.S.C. 154(b) by 306 days.

(21) Appl. No.: 13/258,352

(22) PCT Filed: Feb. 19, 2010

(86) PCT No.: PCT/JP2010/052491
§ 371 (c)(1),
(2), (4) Date: Sep. 21, 2011

(87) PCT Pub. No.: WO2010/113558
PCT Pub. Date: Oct. 7, 2010

(65) Prior Publication Data
US 2012/0018927 A1 Jan. 26, 2012

(30) Foreign Application Priority Data
Mar. 31, 2009 (JP) ................................. 2009-085074

(51) Int. Cl.
*B29C 45/34* (2006.01)
(52) U.S. Cl.
USPC ..................... 264/500; 264/328.2; 264/328.9; 425/546; 425/812
(58) Field of Classification Search
USPC .................. 264/500, 328.2, 328.9, 101, 102; 425/557, 546, 812
See application file for complete search history.

(56) References Cited

U.S. PATENT DOCUMENTS

| 2,976,571 | A | * | 3/1961 | Moslo | 249/141 |
| 3,266,099 | A | * | 8/1966 | Bucy | 249/141 |
| 4,140,470 | A | * | 2/1979 | Pasch et al. | 425/544 |

FOREIGN PATENT DOCUMENTS

| CN | 1517452 A | 8/2004 |
| JP | 11-170266 A | 6/1999 |
| JP | 2004-223766 A | 8/2004 |
| JP | 2007-290175 A | 11/2007 |
| JP | 2008-168448 A | 7/2008 |

* cited by examiner

*Primary Examiner* — Jill Heitbrink
(74) *Attorney, Agent, or Firm* — Harness, Dickey & Pierce, P.L.C.

(57) ABSTRACT

To prevent defective molding, a base member is set between split molds of a metal mold, a molding rubber material is injected into an endless shape cavity defined between the base member and the split mold, an injection amount thereof is made such that the molding rubber material fills the cavity and thereafter flows from an air vent hole open to a confluence position in the cavity into a surplus material reservoir provided downstream but does not fill the surplus material reservoir, pressure drop due to flow resistance is caused to the molding rubber material flowing into the surplus material reservoir, and thereby pressure in the cavity is maintained to be not lower than pressure required to mold a gasket and lower than pressure causing leakage from the cavity.

6 Claims, 5 Drawing Sheets

SEAL COMPONENT MANUFACTURING METHOD AND MOLD

CROSS-REFERENCE TO RELATED APPLICATIONS

This application is a U.S. National Stage Application of International application No. PCT/JP2010/052491 filed on Feb. 19, 2010, and published in Japanese as WO 2010/113558 A1 on Oct. 7, 2010. This application claims priority to Japanese Application No. 2009-085074 filed Mar. 31, 2009. The disclosures of the above applications are incorporated herein by reference.

BACKGROUND OF THE INVENTION

1. Field of the Invention

The present invention relates to a method of manufacturing a seal component obtained by integrally molding a gasket made of a rubber material or a synthetic resin material having a rubber-like elasticity on a film, sheet or plate-like base frame, such as a seal for a fuel battery or the like for sealing a flow path, for example, formed in each of fuel battery cells of a fuel battery stack, and a metal mold used for the same.

2. Description of the Conventional Art

The fuel battery has a stack structure in which a power generation body including a membrane electrode assembly (MEA) provided with a pair of electrode layers on both surfaces of an electrolyte membrane is held between separators so as to form a fuel battery cell, and a lot of the fuel battery cells are laminated. Air (oxygen) is supplied to one catalyst electrode layer (an air electrode) from an air flow path formed on one surface of each of the separators, fuel gas (hydrogen) is supplied to another catalyst electrode layer (a fuel electrode) from a fuel gas flow path formed on another surface of each of the separators, and electric power is generated on the basis of an electrochemical reaction corresponding to a reverse reaction to an electrolytic process of water, that is, a reaction creating water from hydrogen and oxygen.

Accordingly, each of the fuel battery cells is provided with a seal component for preventing leakage of fuel gas, air, the water created by the electrochemical reaction mentioned above, surplus air or the like. As this kind of seal component, there have been known a structure in which a gasket made of a rubber material or a synthetic resin material having a rubber-like elasticity is integrated on a film-like, sheet-like or plate-like base member such as a separator, a synthetic resin film or the like.

Figure 7:
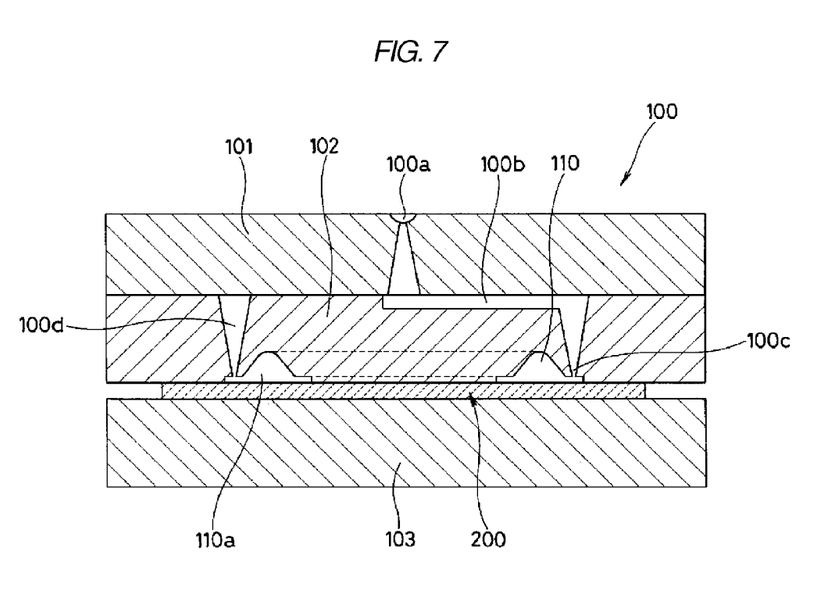
FIG. 7 is a sectional view of a metal mold and a base member and shows a seal component manufacturing method in accordance with a conventional art.

In order to manufacture this kind of seal component, a metal mold 100 constructed by split molds 101 to 103 has been conventionally used, and a gasket made of a rubber-like elastic material is integrated with a base member 200 at the same time of molding, by positioning and fixing the base member 200 between the split molds 102 and 103, clamping the metal mold, charging a liquid molding rubber material into an annular cavity 110 defined between the base member 200 and an inner surface of the split mold 102 through a sprue 100a, a runner 100b and a gate 100c which are formed in the split molds 101 and 102, and hardening it by cross-linking, for example, as shown in FIG. 7.

In this case, since the gasket is consecutive in an endless shape, and the cavity 110 for molding it has the same shape, the liquid molding rubber material charged into the cavity 110 flows divergently from the gate 100c to both sides thereof, and confluence occurs at a position 110a opposite to the gate 100c. Further, since defective molding tends to be caused at this confluence position 110a due to remaining air or mixing of volatile gas from the molding rubber material, an air vent hole 100d for letting out the remaining air and the volatile gas mentioned above, and well mixing the confluent molding rubber material is formed in the split mold 102. One end of the air vent hole 100d is open to the confluence position 110a in the cavity 110, and another end of it is open to contact surfaces of the split molds 101 and 102 (refer to Japanese Unexamined Patent Publication No. 2008-168448).

Figure 8:
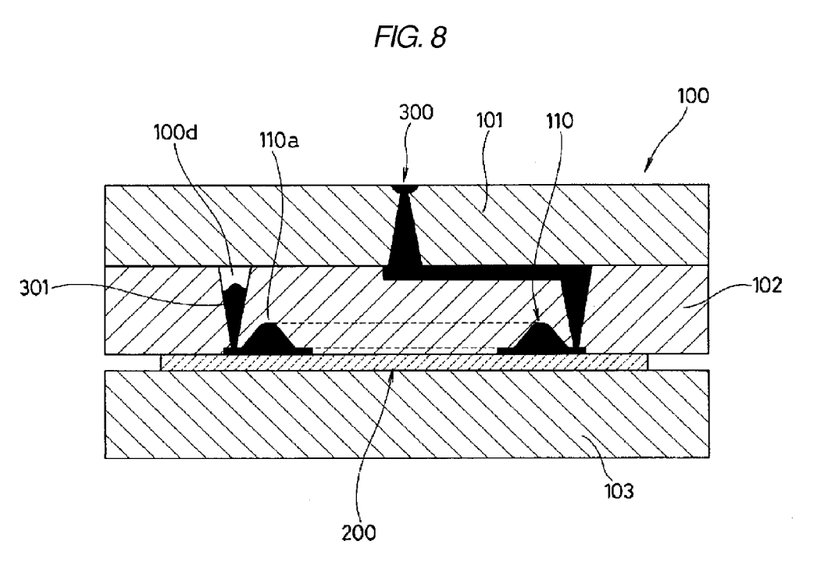
FIG. 8 is a sectional view of the metal mold and the base member and shows a state in which molding pressure is short in the conventional art.

However, according to the conventional art mentioned above, as shown in FIG. 8, in the case that a part 301 of the molding rubber material 300 flowing into the air vent hole 100d through confluence at the confluence position 110a in the cavity 110 does not fill the air vent hole 100d, it is impossible to keep molding pressure within the cavity 110 properly. Accordingly, there is a risk of causing defective molding such as reduction of physical properties of the material of the gasket due to lack of pressure, dispersion of gasket dimensions due to molding shrinkage, remaining of air in the other portions than the confluence position 110a in the cavity 110, and the like.

Figure 9:
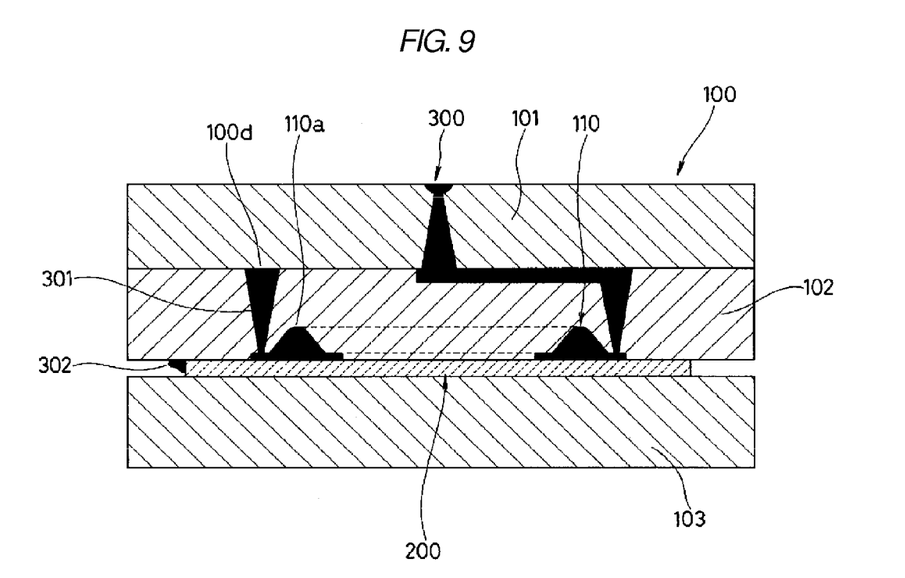
FIG. 9 is a sectional view of the metal mold and the base member and shows a state in which the molding pressure is excessive in the conventional art.

Further, as shown in FIG. 9, in the case that the part 301 of the molding rubber material 300 flowing into the air vent hole 100d through confluence at the confluence position 110a in the cavity 110 fills the air vent hole 100d, the surplus molding rubber material can go nowhere at that moment, so that a molding pressure within the cavity 110 rapidly rises. Therefore, in this case, there are risks that a part of the molding rubber material 300 within the cavity 110 leaks along the contact surfaces between the base member 200 and the split mold 102 so as to make a thin burr 302, and that the base member 200 is damaged by an excessive molding pressure in some material of the base member 200.

Accordingly, it is necessary to a measure an injection amount of the molding rubber material 300 and control an injection pressure thereof with high precision in such a manner as to keep the molding pressure within the cavity 110 at an appropriate value, as well as filling the air vent hole 100d with the part 301 of the molding rubber material 300. Particularly, in a product having a lot of gates, it is necessary to make the molding rubber material being simultaneously charged into all the air vent holes at the confluence positions between the gates, however, such a control is extremely hard. As a result, it is impossible to prevent the thin burr 302 from being made, so that a removing work of the thin burr 302 is inevitable, and is an obstacle to cost reduction.

The present invention is made by taking the points as mentioned above into consideration, and a technical object thereof is to appropriately keep molding pressure within a cavity at a time of charging a molding rubber material, thereby effectively preventing occurrence of defective molding and a thin burr due to leakage of the molding rubber material.

SUMMARY OF THE INVENTION

As a means for effectively solving the technical problem mentioned above, in accordance with a first aspect of the present invention, there is provided a method of manufacturing a seal component obtained by integrally molding an endless shaped gasket made of a rubber-like elastic material on a base member, comprising the steps of:

setting the base member between split molds of a metal mold to clamp the metal mold;

injecting a molding rubber material to an endless shaped cavity defined between a surface of the base member and an inner surface of the split mold opposed to the surface;

making an amount of the injection to be such an amount that the molding rubber material fills the cavity, and thereafter flows into a surplus material reservoir provided at a downstream side of an air vent hole from the air vent hole open to a confluence position of the molding rubber material within the cavity but does not fill the surplus material reservoir;

causing pressure drop on the basis of flow resistance to the molding rubber material flowing into the surplus material reservoir from the air vent hole; and keeping internal pressure of the cavity to be equal to or more than a lower limit value of pressure which is necessary for molding the gasket and be less than a lower limit value of pressure which causes leakage from the cavity, on the basis of the pressure drop.

Further, in accordance with a second aspect of the present invention, there is provided a metal mold for manufacturing a seal component, comprising:

an endless shaped gasket molding cavity defined between a surface of a base member set between split molds of the metal mold and an inner surface of the split mold opposed to the surface;

an air vent hole open to a confluence position of a molding rubber material within the cavity; and a surplus material reservoir extended at a downstream side thereof via an orifice, wherein the orifice and the surplus material reservoir are formed along contact surfaces of the split molds at the opposite side to the cavity, and the orifice causes a pressure drop on the basis of flow resistance to the molding rubber material flowing into the surplus material reservoir from the air vent hole.

On the basis of the seal component manufacturing method in accordance with the first aspect of the present invention, since the molding rubber material charged into the cavity flows into the air vent hole through confluence at the confluence position in the cavity and fills the air vent hole, thereafter the pressure drop is caused on the basis of the flow resistance in the process of the molding rubber material flowing into the surplus material reservoir at the downstream side thereof, and the molding pressure within the cavity rises at that degree, the defective molding due to lack of the molding pressure is prevented. Further, since the molding pressure is held down to be less than the pressure which causes leakage of the molding rubber material from the cavity, it is possible to prevent the thin burr from being made by the leakage of the molding rubber material. Further, it is possible to easily determine that the molding pressure is held appropriately, and therefore that physical properties of the molded gasket are appropriate, by checking out that the rubber material exists in the surplus material reservoir after molding.

Further, on the basis of the metal mold for manufacturing the seal component in accordance with the second aspect of the present invention, it is possible to achieve the seal component manufacturing method in accordance with the first aspect of the present invention.

DETAILED DESCRIPTION OF THE PREFERRED EMBODIMENTS

A description will be given below of the preferable embodiments of a seal component manufacturing method in accordance with the present invention with reference to the accompanying drawings. First of all, FIG. 1 is a sectional view showing a seal component which is obtained by integrally molding a gasket made of a rubber-like elastic material on one surface of a base member, by a seal component manufacturing method in accordance with the present invention.

Figure 1:
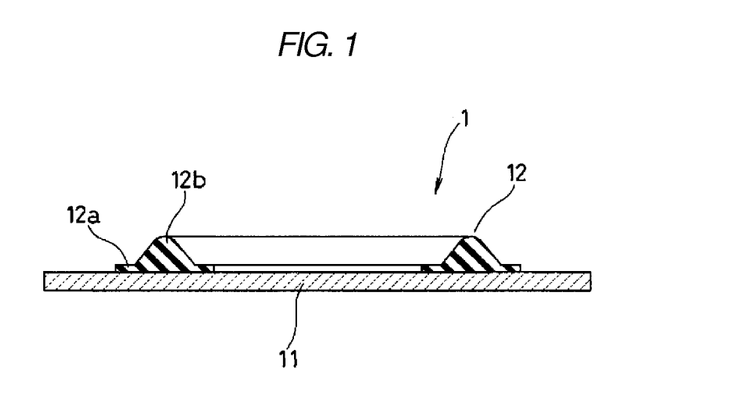
FIG. 1 is a sectional view showing a seal component which is obtained by integrally molding a gasket made of a rubber-like elastic material on one surface of a base member, by a seal component manufacturing method in accordance with the present invention.

A seal component 1 shown in FIG. 1 is used as a sealing means of each of cells in a fuel battery, and is obtained by integrally molding a gasket 12 made of a rubber-like elastic material on one surface of a base member 11.

Describing in detail, the base member 11 is made, for example, of a synthetic resin film, a carbon plate, a ceramics, a metal porous material, a metal thin plate or the like, however, is not limited particularly. The gasket 12 is made of a rubber material or a synthetic resin material having a rubber-like elasticity, is consecutive in an annular shape (an endless shape) along the vicinity of an outer periphery of the base member 11, and has a base portion 12a which is bonded to one surface of the base member 11, and a seal lip 12b which protrudes in a chevron shape from an upper surface thereof.

In other words, the seal component 1 has a function of preventing oxygen supplied to an air electrode from being mixed into a flow path of hydrogen gas supplied to a fuel electrode or, inversely, preventing the hydrogen gas from being mixed into an air flow path so as to prevent a power generation efficiency from being lowered, on the basis of close contact of the seal lip 12b of the gasket 12 with a surface of another member (a separator or the like) which is not illustrated, with an appropriate collapsing margin.

Figure 2:
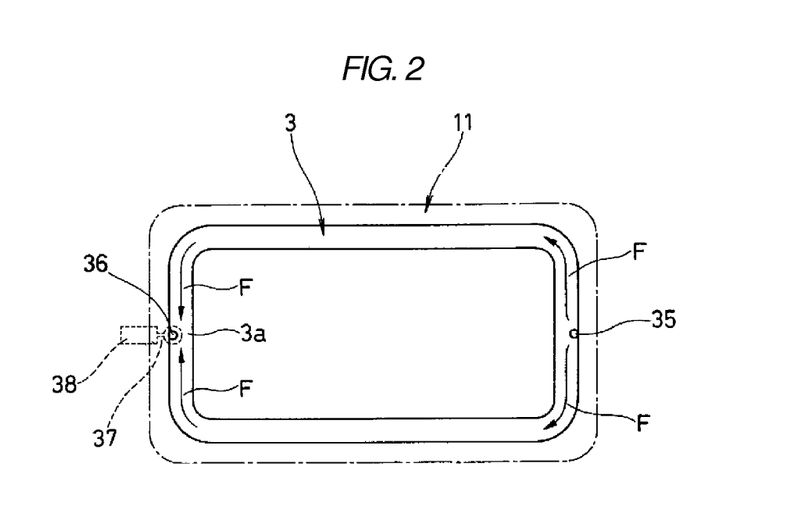
FIG. 2 is a plan view showing a relationship between the base member, and a gate, a cavity and an air vent hole of a metal mold which is used in a first embodiment of the seal component manufacturing method in accordance with the present invention.
Figure 3:
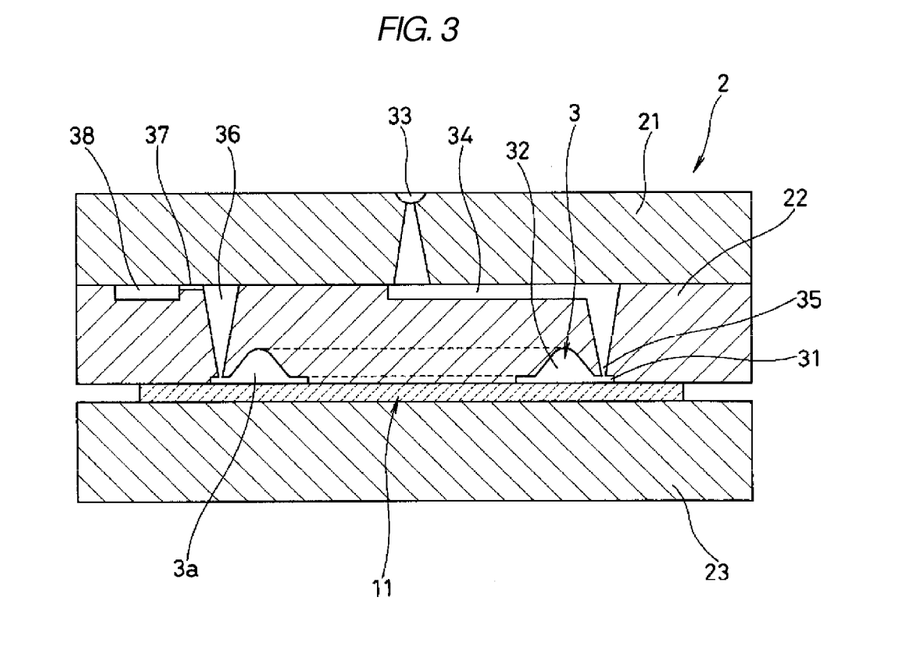
FIG. 3 is a sectional view showing the relationship between the base member, and the gate, the cavity and the air vent hole of the metal mold which is used in the first embodiment of the seal component manufacturing method in accordance with the present invention.
Figure 4:
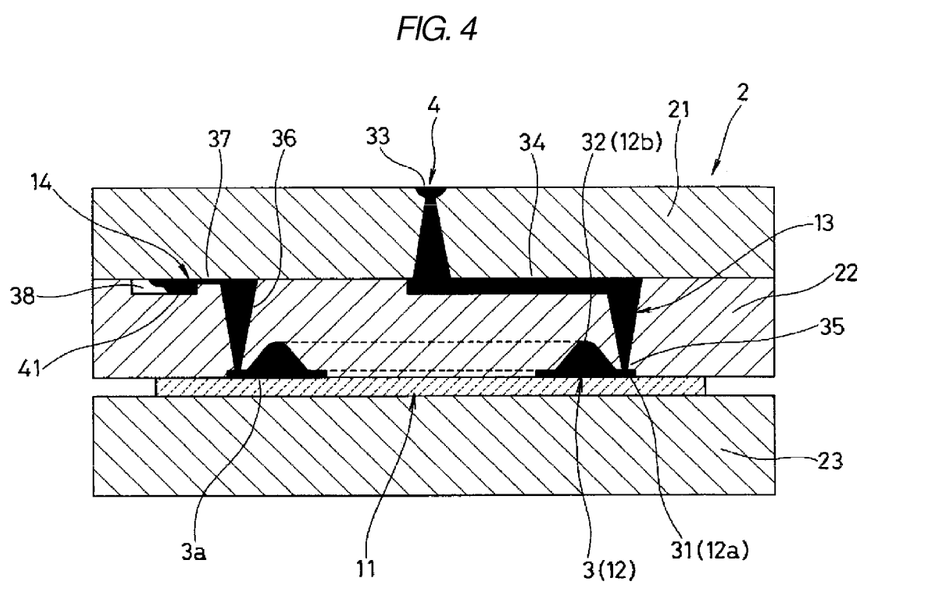
FIG. 4 is a sectional view showing a molding process by the metal mold which is used in the first embodiment of the seal component manufacturing method in accordance with the present invention.

The seal component 1 having the structure mentioned above is manufactured by the method of the present invention shown in FIGS. 2 and 3. FIG. 2 is a plan view showing a relationship between the base member, and a gate, a cavity and an air vent hole of a metal mold which is used in a first embodiment of the seal component manufacturing method in accordance with the present invention, FIG. 3 is a sectional view of the same, and FIG. 4 is a sectional view showing a molding process.

In other words, in FIG. 3, reference numeral 2 denotes the metal mold for integrally molding the gasket on one surface of the base member 11, which is constructed by split molds 21 to 23. The base member 11 is set between an inner surface (an upper surface) of the split mold 23 at the lowest side in FIG. 3 and an inner surface (a lower surface) of the split mold 22 which is combined above it, and a cavity 3 for molding the gasket is defined between the base member 11 and the inner surface of the split mold 22 above it, in an illustrated state of the metal mold being clamped.

The cavity 3 has a sectional shape corresponding to that of the gasket 12 shown in FIG. 1 in a negative and positive relation, is consecutive in an annular shape (an endless shape) along the vicinity of an outer periphery of the set base member 11, as shown in FIG. 2, and is constructed by a flat base molding portion 31 at the base member 11 side, and a seal lip molding portion 32 which becomes deeper in an approximately V-shape in the middle in a width direction thereof.

The split mold 21 in the uppermost in FIG. 3 is provided with a sprue 33 which a nozzle of an injection machine (not shown) is connected to and disconnected from, and a runner 34 extending from a downstream end of the sprue 33 is formed between contact surfaces of the split molds 21 and 22.

The split mold 22 is provided with one or a plurality of gates 35 which extend from a downstream end of the runner 34 and are open to the cavity 3, and one or a plurality of air vent holes 36 for discharging remaining air or volatile gas at confluence positions 3a of flows F (refer to FIG. 2) of a liquid molding rubber material which is charged into the cavity 3 from the gates 35. Further, one ends of the gate 35 and the air vent hole 36 are open to positions in the base molding portion 31 at an outer periphery side of the seal lip molding portion 32 in the cavity 3.

A surplus material reservoir 38 is provided from another end of the air vent hole 36 reaching the contact surfaces of the split molds 21 and 22 via an orifice 37. The orifice 37 and the surplus material reservoir 38 are extended along the contact surfaces of the split molds 21 and 22.

The orifice 37 is structured such as to causes pressure drop on the basis of flow resistance to the molding rubber material which flows into the surplus material reservoir 38, and a length and a flow path cross sectional area of the orifice 37 are made such that internal pressure of the cavity 3 which relatively rises on the basis of the pressure drop becomes equal to or more than a lower limit value of molding pressure which is necessary for molding the gasket, and becomes less than a lower limit value of pressure which causes leakage of a molding rubber material 4 to the contact surfaces between the base member 11 and the split mold 22 from the cavity 3.

In order to manufacture the seal component 1 shown in FIG. 1 by the metal mold 2 having the structure as mentioned above, the base member 11 is set within the metal mold 2, the metal mold is clamped as shown in FIG. 3, and the liquid molding rubber material 4 is injected from a nozzle of an injection machine (not shown) connected to the sprue 33 into the cavity 3 via the sprue 33, the runner 34 and the gate 35 as shown in FIG. 4, after the inside of the cavity 3 is previously evacuated by a vacuum pump or the like (not shown).

At this time, an amount of injection of the molding rubber material 4 which is measured in the injection machine is made to be more than a sum of a volumetric capacities of the sprue 33, the runner 34, the gate 35, the cavity 3, the air vent hole 36 and the orifice 37, and less than an amount obtained by adding a volumetric capacity of the surplus material reservoir 38 thereto. In other words, the molding rubber material injected through the sprue 33, the runner 34 and the gate 35 is made to an amount which fills the cavity 3, thereafter fills the air vent hole 36 which is open to the confluence position 3a of the molding rubber material 4 within the cavity 3, and further flows into the surplus material reservoir 38 via the orifice 37 but does not fill the surplus material reservoir 38.

In this case, as the molding rubber material 4, a molding rubber material having an adhesive property with respect to the base member 11 is preferably used. However, in the case that a molding rubber material having no adhesive property is used, an adhesive agent is previously applied to the base member 11.

The molding rubber material 4 injected through the sprue 33, the runner 34 and the gate 35 from the injection machine branches to both sides from the gate 35 to flow so as to fill the cavity 3 as shown by arrows F in FIG. 2, and flows into the air vent hole 36 through confluence at the confluence position 3a. At this time, since the inside of the air vent hole 36 which is open to the confluence position 3a of the molding rubber material in the cavity 3 is depressurized, remaining air at the confluence position 3a and volatile gas from the molding rubber material are discharged from the air vent hole 36, and confluence and mergence of the molding rubber material are well carried out. Further, even if air bubbles caused by the remaining air and the volatile gas are mixed into the confluence position 3a, they flow out to the air vent hole 36 together with a part of the molding rubber material. Accordingly, it is possible to effectively prevent defective molding from being caused.

Further, since the pressure drop is causes on the basis of the flow resistance in the orifice 37, in the process that the molding rubber material 4 fills the air vent hole 36 and thereafter flows into the surplus material reservoir 38 at a downstream side thereof, the molding pressure within the cavity 3 rises at that degree, and is kept to be equal to or more than the lower limit value of the molding pressure which is necessary for molding the gasket. Accordingly, it is possible to prevent reduction of physical properties of the material of the gasket 12 on the basis of lack of the molding pressure, dispersion of dimensions of the gasket 12 on the basis of molding shrinkage, and defective molding on the basis of remaining of air in the other portions than the confluence position 3a in the cavity 3.

Further, since the molding pressure within the cavity 3 does not rapidly rise on the basis of the surplus molding rubber material 4 which can go nowhere at the moment that the molding rubber material 4 fills the air vent hole 36, and the molding pressure within the cavity 3 is held down to be less than the lower limit value of the pressure, which causes the leakage of the molding rubber material 4 between the contact surfaces of the base member 11 and the split mold 22, on the basis of the outflow to the surplus material reservoir 38, it is possible to effectively prevent a part of the molding rubber material 4 within the cavity 3 from leaking to the contact surfaces between the base member 11 and the split mold 22 so as to make a thin burr, and prevent the base member 11 from being damaged by excessive molding pressure.

As is previously described, since the amount of injection of the molding rubber material 4 is measured to be more than the sum of the volumetric capacities of the sprue 33, the runner 34, the gate 35, the cavity 3, the air vent hole 36 and the orifice 37, and be less than the amount obtained by adding the volumetric capacity of the surplus material reservoir 38 thereto, the injection is finished at a time point when a part 41 of the molding rubber material 4 in such an amount that does not fill the surplus material reservoir 38 flows in from the orifice 37.

Further, since the molding rubber material 4 charged into the metal mold 2 is hardened with age by cross-linking, the gasket 12 made of the rubber-like elastic material is integrally molded on one surface of the base member 11.

Further, it is possible to easily determine that the molding pressure is properly held, and therefore that there is no reduction of the physical properties of the molded gasket 12, no dispersion of the dimensions of the gasket 12 on the basis of molding shrinkage, and no defective molding on the basis of remaining of air, by checking out that the rubber material exists in the surplus material reservoir 38, at a time of opening the metal mold after the molding to pick up the product.

Further, as shown in FIG. 4, a non-product portion 14 formed by the molding rubber material flowing into the air vent hole 36, the orifice 37 and the surplus material reservoir 38 is formed on an upper surface of the base portion 12a of the gasket 12 in the same manner as a non-product portion 13 formed by the molding rubber material within the sprue 33, the runner 34 and the gate 35. Accordingly, it is possible to carry out removal of the non-product portion 14 formed by the air vent hole 36 to the surplus material reservoir 38 at the same time and in the same manner as removal of the non-product portion 13 formed by the sprue 33 to the gate 35, and the work is easily carried out. Further, since the thin burr is not made by leakage of a part of the molding rubber material 4 within the cavity 3 to the contact surfaces between the base member 11 and the split mold 22, a removing work of the thin burr mentioned above is not necessary, and removal traces of the non-product portions 13 and 14 are not formed on the seal lip 12b. Therefore, a sealing performance is not adversely affected.

Figure 5:
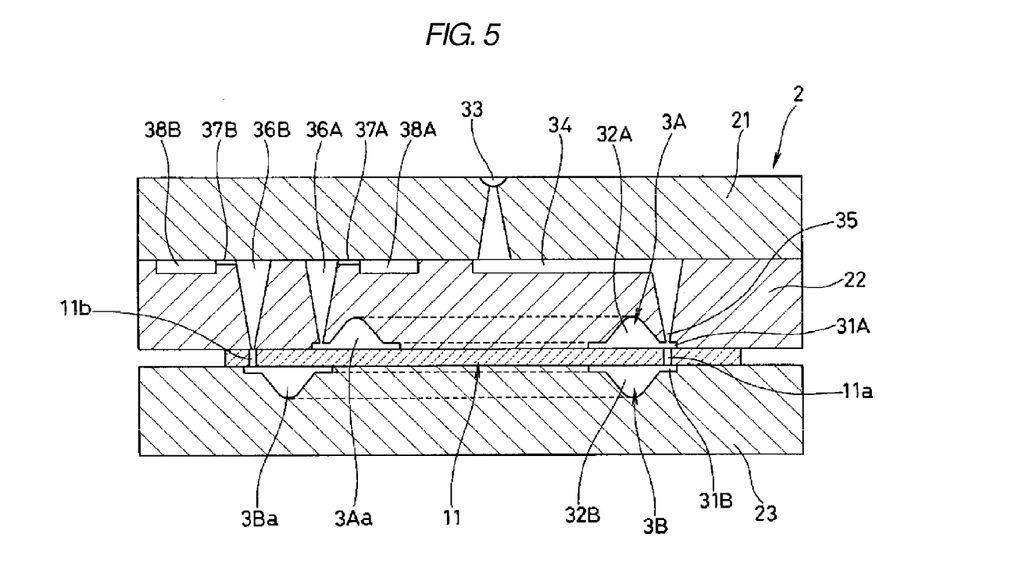
FIG. 5 is a sectional view showing a relationship between the base member, and a gate, a cavity and an air vent hole of a metal mold which is used in a second embodiment of the seal component manufacturing method in accordance with the present invention.

Next, FIG. 5 is a sectional view showing a relationship between the base member, and a gate, a cavity and an air vent hole of a metal mold which is used in a second embodiment of the seal component manufacturing method in accordance with the present invention. This embodiment is provided for integrally molding gaskets having different extension shapes (lip lines) on both surfaces of the base member 11.

Describing in detail, reference numeral 2 in FIG. 5 denotes a metal mold for integrally molding the gaskets on both the surfaces of the base member 11, which is constructed by split molds 21 to 23. The base member 11 is set between an inner surface (an upper surface) of the split mold 23 at the lowest side in FIG. 5, and an inner surface (a lower surface) of the split mold 22 which is combined above it, and first and second cavities 3A and 3B for molding the gaskets are defined between the base member 11 and the inner surfaces of the split molds 22 and 23 at both side thereof in the state of the metal mold being clamped as shown in the figure.

The first and second cavities 3A and 3B respectively have sectional shapes corresponding to those of the gaskets to be molded in a negative and positive relation, are consecutive in annular shapes (endless shapes) along the vicinity of an outer periphery of the set base member 11, and are respectively constructed by flat base molding portions 31A and 31B at the base member 11 side, and seal lip molding portions 32A and 32B which become deeper in an approximately V-shape in the middle in a width direction thereof. Further, the first cavity 3A and the second cavity 3B are connected with each other between the base molding portions 31A and 31B via a first communication hole 11a which is provided in the base member 11, and parts thereof in a peripheral direction, in more detail, parts at an opposite side in the peripheral direction position where the first communication hole 11a is provided, extend at different positions from each other, thereby forming different extension shapes from each other at both sides of the base member 11.

The split mold 21 at the uppermost side in FIG. 5 is provided with a sprue 33 which a nozzle of an injection machine (not shown) is connected to and disconnected from, and a runner 34 extending from a downstream end of the sprue 33 is formed between contact surfaces of the split molds 21 and 22.

The split mold 22 is provided with one or a plurality of gates 35 which extend from a downstream end of the runner 34 and are open to the first cavity 3A at an upper side of the base member 11, one or a plurality of air vent holes 36A for discharging remaining air or volatile gas at a confluence position 3Aa of a liquid molding rubber material which is charged into the first cavity 3A from the gates 35, and one or a plurality of second air vent holes 36B for discharging remaining air or volatile gas at a confluence position 3Ba of a liquid molding rubber material which is charged into the second cavity 3B via the first communication hole 11a provided in the base member 11 from the gates 35.

Among them, the gate 35 is open to the base molding portion 31A in the first cavity 3A so as to correspond to an open position of the first communication hole 11a, and an opening diameter of the first communication hole 11a is formed to be larger in comparison with an opening diameter of the gate 35.

Further, one end of the first air vent hole 36A is open to a position in the base molding portion 31A at an outer periphery side of the seal lip molding portion 32A in the first cavity 3A.

The base member 11 is provided with a second communication hole 11b in addition to the first communication hole 11a mentioned above. The second communication hole 11b is open to the confluence position 3Ba of flows of the molding rubber material which is charged into the second cavity 3B through the first communication hole 11a from the first cavity 3A.

Further, one end of the second air vent hole 36B is open to the confluence position 3Ba of the molding rubber material which is charged into the second cavity 3B through the first communication hole 11a in the base member 11 from the first cavity 3A, that is, a position corresponding to the second communication hole 11b in the base member 11.

First and second surplus material reservoirs 38A and 38B are respectively provided from another ends of the first and second air vent holes 36A and 36B reaching the contact surfaces of the split molds 21 and 22 via first and second orifices 37A and 37B. The first and second orifices 37A and 37B and the first and second surplus material reservoirs 38A and 38B are extended along the contact surfaces of the split molds 21 and 22.

The first and second orifices 37A and 37B are respectively structured such as to cause pressure drop on the basis of flow resistance to the molding rubber material which flows into the first and second surplus material reservoirs 38A and 38B, a length and a flow path cross sectional area of the first orifice 37A are made such that internal pressure of the first cavity 3A which relatively rises on the basis of the pressure drop becomes equal to or more than a lower limit value of molding pressure which is necessary for molding the gasket, and becomes less than a lower limit value of pressure which causes a leakage of the molding rubber material 4 to the contact surfaces between the base member 11 and the split mold 22 from the first cavity 3A, and a length and a flow path cross sectional area of the second orifice 37B are made such that internal pressure of the second cavity 3B which relatively rises on the basis of the pressure drop becomes equal to or more than the lower limit value of molding pressure which is necessary for molding the gasket, and becomes less than the lower limit value of pressure which causes the leakage of the molding rubber material 4 to the contact surfaces between the base member 11 and the split mold 23 from the second cavity 3B.

In the case that the seal component is manufactured by the metal mold 2 having the structure as mentioned above, the base member 11 is set within the metal mold 2, the metal mold is clamped, and the liquid molding rubber material 4 is injected from the nozzle of the injection machine (not shown) connected to the sprue 33 via the sprue 33, the runner 34 and the gate 35, after evacuating by means of the vacuum pump or the like (not shown), in the same manner as the first embodiment.

At this time, an amount of injection of the molding rubber material which is measured in the injection machine is made to be more than a sum of a volumetric capacities of the sprue 33, the runner 34, the gate 35, the first and second cavities 3A and 3B, the first and second communication holes 11a and 11b, the first and second air vent holes 36A and 36B and the first and second orifices 37A and 37B, and less than an amount obtained by adding volumetric capacities of the first and second surplus material reservoirs 38A and 38B thereto. In other words, the molding rubber material injected through the sprue 33, the runner 34 and the gate 35 is made to an amount which fills the first and second cavities 3A and 3B, thereafter fills the first and second air vent holes 36A and 36B which are open to the respective confluence positions 3Aa and 3Ba of the molding rubber material within the cavity 3, and further flows into the first and second surplus material reservoirs 38A and 38B via the first and second orifices 37A and 37B but does not fill the first and second surplus material reservoirs 38A and 38B.

The molding rubber material which is injected through the sprue 33, the runner 34 and the gate 35 from the injection machine branches to both sides (directions orthogonal to the illustrated section) from the gate 35 to flow so as to fill the first cavity 3A, and the molding rubber material is approximately simultaneously charged into the second cavity 3B from the first cavity 3A through the first communication hole 11a of the base member 11 which is positioned just below the gate 35.

At this time, since the in-side of the first air vent hole 36A which is open to the confluence position 3Aa of the molding rubber material in the first cavity 3A is depressurized, remaining air at the confluence position 3Aa and volatile gas from the molding rubber material are discharged from the first air vent hole 36A, and the molding rubber material within the first cavity 3A flows into the first air vent hole 36A through confluence. Further, since the in-side of the second air vent hole 36B which is open to the confluence position 3Ba of the molding rubber material in the second cavity 3B is also depressurized, remaining air at the confluence position 3Ba and volatile gas from the molding rubber material are discharged from the second air vent hole 36B via the second communication hole 11b, and the molding rubber material within the second cavity 3B flows into the second air vent hole 36B via the second communication hole 11b through confluence. Accordingly, confluence and a mergence of the molding rubber material are well carried out. Further, even if air bubbles caused by the remaining air and the volatile gas are mixed into the confluence positions 3Aa and 3Ba, they flow out to the first and second air vent holes 36A and 36B together with parts of the molding rubber material.

Further, since the pressure drop is caused on the basis of the flow resistance in the first and second orifices 37A and 37B, in the process that the molding rubber material fills the first and second air vent holes 36A and 36B and thereafter flows into the first and second surplus material reservoirs 38A and 38B at a downstream side thereof, the molding pressure within the first and second cavities 3A and 3B rises at that degree, and is kept to be equal to or more than the lower limit value of the molding pressure which is necessary for molding the gasket. Accordingly, it is possible to prevent reduction of physical properties of the material of the gasket on the basis of lack of the molding pressure, dispersion of dimensions of the gasket on the basis of molding shrinkage, and defective molding on the basis of remaining of air in the other portions than the confluence positions 3Aa and 3Ba in the first and second cavities 3A and 3B.

Further, since the molding pressure within the first and second cavities 3A and 3B does not rapidly rise on the basis of the surplus molding rubber material which can go nowhere at the moment that the molding rubber material fills the first and second air vent holes 36A and 36B, and the molding pressure within the first and second cavities 3A and 3B is held down to be less than the lower limit value of the pressure which causes the leakage, on the basis of the outflow to the first and second surplus material reservoirs 38A and 38B, it is possible to effectively prevent a part of the molding rubber material from leaking to the contact surfaces between the base member 11 and the split mold 22 from the first cavity 3A so as to make a thin burr, prevent a part of the molding rubber material from leaking to the contact surfaces between the base member 11 and the split mold 23 from the second cavity 3B so as to make a thin burr, and prevent the base member 11 from being damaged by excessive molding pressure.

As is previously described, since the amount of injection of the molding rubber material 4 is measured to be more than the sum of the volumetric capacities of the sprue 33, the runner 34, the gate 35, the first and second cavities 3A and 3B, the first and second communication holes 11a and 11b, the first and second air vent holes 36A and 36B and the first and second orifices 37A and 37B, and be less than the amount obtained by adding the volumetric capacity of the first and second surplus material reservoirs 38A and 38B thereto, the injection is finished at a time point when a part of the molding rubber material in such an amount that does not fill the first and second surplus material reservoirs 38A and 38B flows in from the first and second orifices 37A and 37B.

Further, since the molding rubber material charged into the metal mold 2 is hardened with age by cross-linking, the gasket made of the rubber-like elastic material is integrally molded on both surfaces of the base member 11.

Further, it is possible to easily determine that the molding pressure is properly held, and therefore that there is no reduction of the physical properties of the molded gasket, no dispersion of the dimensions of the gasket on the basis of molding shrinkage, and no defective molding on the basis of remaining of air, by checking out that the rubber material exists in the first and second surplus material reservoirs 38A and 38B, at a time of opening the metal mold after the molding to pick up the product.

Further, a non-product portion (not shown) formed by a part of the molding rubber material flowing into the first air vent hole 36A, the first orifice 37A and the first surplus material reservoir 38A extends from the upper surface of the base portion of the gasket, in the same manner as a non-product portion (not shown) formed by the molding rubber material within the sprue 33, the runner 34 and the gate 35. Further, a non-product portion (not shown) formed by a part of the molding rubber material flowing into the second air vent hole 36B, the second orifice 37B and the second surplus material reservoir 38B extends from the inner side of the second communication hole 11b in the base member 11. Accordingly, it is possible to easily carry out removal of the non-product portions. Further, since removal traces of the non-product portions are not formed on the seal lip, a sealing performance is not adversely affected. Further, since a thin burr is not made by leakage of a part of the molding rubber material within the first and second cavities 3A and 3B to the contact surfaces between the base member 11 and the split mold 22 or the split mold 23, a removing work of the thin burr as mentioned above is not necessary.

Figure 6:
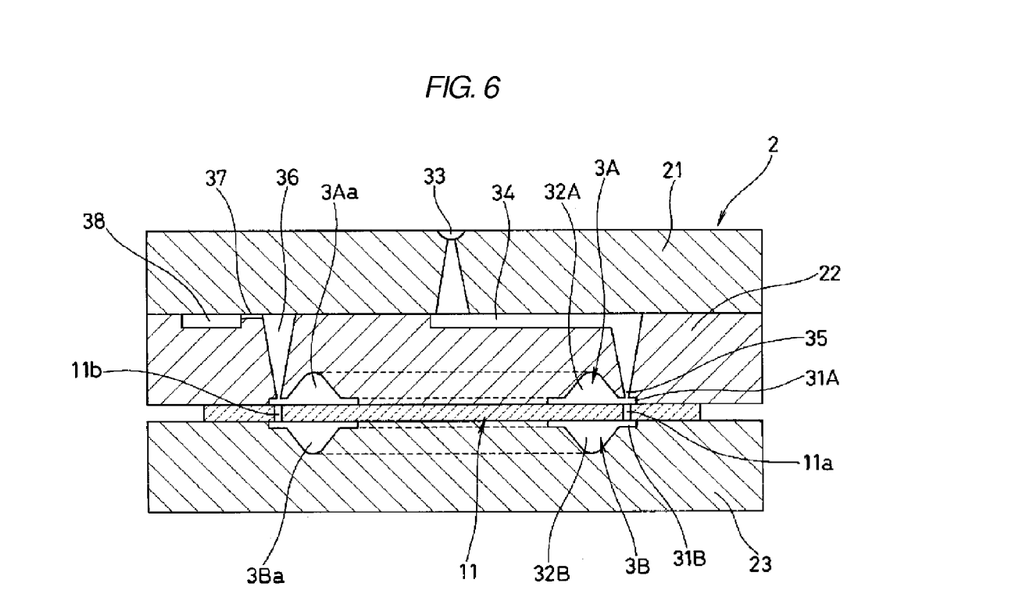
FIG. 6 is a sectional view showing a relationship between the base member, and a gate, a cavity and an air vent hole of a metal mold which is used in a third embodiment of the seal component manufacturing method in accordance with the present invention.

Next, FIG. 6 is a sectional view showing a relationship between the base member, and a gate, a cavity and an air vent hole of a metal mold which is used in a third embodiment of the seal component manufacturing method in accordance with the present invention. This embodiment is also provided for integrally molding gaskets on both surfaces of the base member 11.

In particular, a difference in a metal mold 2 shown in FIG. 6 from the second embodiment mentioned above exists in a point that a first cavity 3A and a second cavity 3B for molding the gaskets defined by a split mold 23 and a second split mold 22 at both upper and lower sides of the base member 11 extend in the same extension shape with each other in the state of the metal mold being clamped.

Accordingly, a first communication hole 11a provided in the base member 11 is open to a portion between a base molding portion 31A of the first cavity 3A and a base molding portion 31B of the second cavity 3B at a position corresponding to a gate 35 which is provided in the second split mold 22, and a second communication hole 11b is open to a portion between confluence positions 3Aa and 3Ba of the molding rubber material which is charged into the first cavity 3A and the second cavity 3B through the gate 35 and the first communication hole 11a. Accordingly, the first cavity 3A and the second cavity 3B communicates with each other via the first communication hole 11a and the second communication hole 11b.

Further, an air vent hole 36 is provided in the split mold 22. One end of the air vent hole 36 is open to the base molding portion 31A at the confluence position 3Aa of the molding rubber material which is charged into the first cavity 3A from the gate 35, that is, a position corresponding to the second communication hole 11b in the base member 11, and another end thereof is open to the contact surfaces of the split molds 21 and 22.

In this case, the other portions can be basically structured in the same manner as the second embodiment shown in FIG. 5 which is described previously, and an amount of injection of the molding rubber material by the injection machine can be made in the same manner as the second embodiment.

Accordingly, in this embodiment, molding can be carried out in the same manner as the second embodiment. In particular, at a time of injecting the molding rubber material, the molding rubber material branches to both sides (directions orthogonal to the illustrated section) from the gate 35 to flow within the first cavity 3A so as to fill the first cavity 3A, and the molding rubber material is approximately simultaneously charged into the second cavity 3B from the first cavity 3A through the first communication hole 11a of the base member 11 which is positioned just below the gate 35.

Further, since the in-side of the air vent hole 36 which is open to the confluence position 3Aa of the molding rubber material in the first cavity 3A is depressurized, remaining air at the confluence position 3Aa and volatile gas from the molding rubber material are discharged from the air vent hole 36, remaining air at the confluence position 3Ba of the molding rubber material in the second cavity 3B and volatile gas from the molding rubber material are discharged from the air vent hole 36 via the second communication hole 11b, and the molding rubber material within the first cavity 3A and the second cavity 3B flows into the air vent hole 36 via the second communication hole 11b through confluence. Accordingly, confluence and mergence of the molding rubber material are well carried out. Further, even if air bubbles caused by the remaining air and the volatile gas are mixed into the confluence positions 3Aa and 3Ba, they flow out to the air vent hole 36 together with parts of the molding rubber material.

Further, since the pressure drop is caused on the basis of the flow resistance in the orifice 37, in the process that the molding rubber material fills in the air vent hole 36 and thereafter flows into the surplus material reservoir 38 at a downstream side thereof, the molding pressure within the first and second cavities 3A and 3B rises at that degree, and is kept to be equal to or more than the lower limit value of the molding pressure which is necessary for molding the gasket. Accordingly, the third embodiment can achieve the same effects as the second embodiment.

What is claimed is:

1. A method of manufacturing a seal component obtained by integrally molding an endless shaped gasket made of an elastomeric material on a base member, comprising the steps of:
   setting the base member between split molds of a mold;
   injecting an injection amount of a molding rubber material to an endless shaped cavity defined between a base surface of the base member and an inner surface of one of the split molds opposed to the base surface of the base member;
   making the injection amount of the molding rubber material be an amount such that the molding rubber material completely fills the cavity, completely fills an air vent hole open to a confluence position of the molding rubber material within the cavity, and thereafter flows through an orifice and into a surplus material reservoir provided at a downstream side of the air vent hole but does not completely fill the surplus material reservoir;
   causing a pressure drop with only the orifice on the basis of flow resistance to the molding rubber material flowing into the surplus material reservoir from the air vent hole through the orifice; and
   keeping an internal pressure of the cavity to be equal to or more than a first lower limit value of pressure for molding the gasket and to be less than a second lower limit value of pressure which causes leakage from the cavity, on the basis of the pressure drop.

2. The method of claim 1 wherein the surplus material reservoir provided at the downstream side of the air vent hole is a closed space.

3. The method of claim 1 wherein a length and a cross sectional flow diameter of the orifice are selected to keep the internal pressure of the cavity equal to or more than the first lower limit value and less than the second lower limit value, on the basis of the pressure drop.

4. A mold for manufacturing a seal component, comprising:
   a base member havin a base surface;
   a first split mold having an inner surface;
   a second split mold having a first surface and an opposite second surface, the first surface of the second split mold facing the base surface of the base member, the second surface of the second split mold facing the inner surface of the first split mold;

an endless shaped gasket molding cavity defined between the base surface of the base member and the first surface of the second split mold;

an air vent hole open to a confluence position of a molding rubber material within the cavity; and a surplus material reservoir extending from a downstream side of the air vent hole via an orifice, wherein the orifice and the surplus material reservoir extend along an interface of the second surface of the second split mold and the inner surface of the first split mold, and the orifice alone causes pressure drop on the basis of flow resistance to the molding rubber material flowing into the surplus material reservoir from the air vent hole through the orifice.

5. The mold of claim 4 wherein the surplus material reservoir extending from the downstream side of the air vent hole is a closed space.

6. The mold of claim 4 wherein a length and a cross sectional flow diameter of the orifice are selected to cause the pressure drop on the basis of flow resistance to the molding rubber material flowing into the surplus material reservoir from the air vent hole.

* * * * *